United States Patent
Baderdinni

(10) Patent No.: US 8,478,939 B2
(45) Date of Patent: Jul. 2, 2013

(54) RELATIVE HEAT INDEX BASED HOT DATA DETERMINATION FOR BLOCK BASED STORAGE TIERING

(75) Inventor: Anant Baderdinni, Lawrenceville, GA (US)

(73) Assignee: LSI Corporation, San Jose, CA (US)

( * ) Notice: Subject to any disclaimer, the term of this patent is extended or adjusted under 35 U.S.C. 154(b) by 182 days.

(21) Appl. No.: 13/178,258

(22) Filed: Jul. 7, 2011

(65) Prior Publication Data

US 2013/0013850 A1 Jan. 10, 2013

(51) Int. Cl.
*G06F 12/00* (2006.01)

(52) U.S. Cl.
USPC ............. 711/117; 711/4; 711/112; 711/149

(58) Field of Classification Search
USPC ................................ 711/4, 112, 117, 149
See application file for complete search history.

(56) References Cited

U.S. PATENT DOCUMENTS

| | | | |
|---|---|---|---|
| 2010/0281230 A1* | 11/2010 | Rabii et al. | 711/165 |
| 2011/0197046 A1* | 8/2011 | Chiu et al. | 711/171 |
| 2011/0252210 A1* | 10/2011 | Davies | 711/165 |

\* cited by examiner

*Primary Examiner* — Reginald Bragdon
*Assistant Examiner* — Gurtej Bansal
(74) *Attorney, Agent, or Firm* — William W. Cochran; Cochran Freund & Young LLC

(57) ABSTRACT

Disclosed is a process for determining a heat index for a block of data, such as an extent, for storage tiering. Weighted scores are used for read and write operations, since solid state devices operate better with read operations than write operations. The heat index associated with each extent is a function of a base score, rather than an absolute value. The base score is determined by adding the number of extents in a hot tier plus the access score, divided by the number of extents in the hot tier. In this fashion, the base score measures the weighted I/O activity relative to the size of the hot tier.

7 Claims, 4 Drawing Sheets

RELATIVE HEAT INDEX BASED HOT DATA DETERMINATION FOR BLOCK BASED STORAGE TIERING

BACKGROUND

Storage of data in large storage devices has been an important functionality provided by large enterprise computer systems. The accumulation of greater amounts of data has expanded the requirements for data access. Large computer systems and networks have now been able to provide extensive amounts of data with relative ease.

Various types of data storage systems exist. More expensive solid state devices can provide data with relative ease and in a very quick manner. Solid state devices, however, are relatively expensive compared to disk drives. Disk drives, on the other hand, can provide large amounts of data, but cannot provide data as quickly as solid state devices. In many applications, it is desirable to be able to store very large amounts of data and access that data in a quick manner.

SUMMARY

An embodiment of the invention may therefore comprise a method of determining a heat index for an extent of data stored in a tiered drive comprising: determining a weighted access score by counting read operations from, and write operations to, the tiered drive, and weighting read operations with a higher score than write operations; determining a number of extents stored in a hot tier of the tiered drive, the hot tier having a predetermined size; calculating a base score that indicates weighted accesses relative to the predetermined size of the hot tier by adding the number of extents in the hot tier plus the weighted access score to generate a sum, which is divided by the number of extents; generating a weighted hit score by counting a number of accesses for each extent with reads having a greater weight than writes; generating a heat index score for each extent by multiplying the base score by the weighted hit score.

An embodiment of the invention may further comprise a system for storing data in a tiered drive based upon a heat index comprising: a tiered virtual drive comprising: a solid state virtual drive comprising a plurality of solid state storage devices; a SAS virtual drive comprising a plurality of SAS storage devices; a SATA virtual drive comprising a plurality of SATA storage devices; a plurality of controllers that control migration of data between the solid state storage devices, the SAS storage devices and the SATA storage devices by counting read and write operations of the tiered virtual drive to create a weighted access score, counting extents of data stored in the solid state storage devices to create a hot tier extent number, adding the hot tier extent number and the weighted access score to create a sum, dividing the sum by the hot tier extent number to create a base score, counting accesses in each of the extents stored in the solid state storage devices to create a weighted hit score for each of the extents, multiplying the base score by the hit score for each of the extents stored in the solid state storage devices to create a heat index for each of the extents stored in the solid state storage devices, using the heat index for each of the extents stored in the solid state storage devices to control the migration of data.

DETAILED DESCRIPTION OF THE EMBODIMENTS

Figure 1:
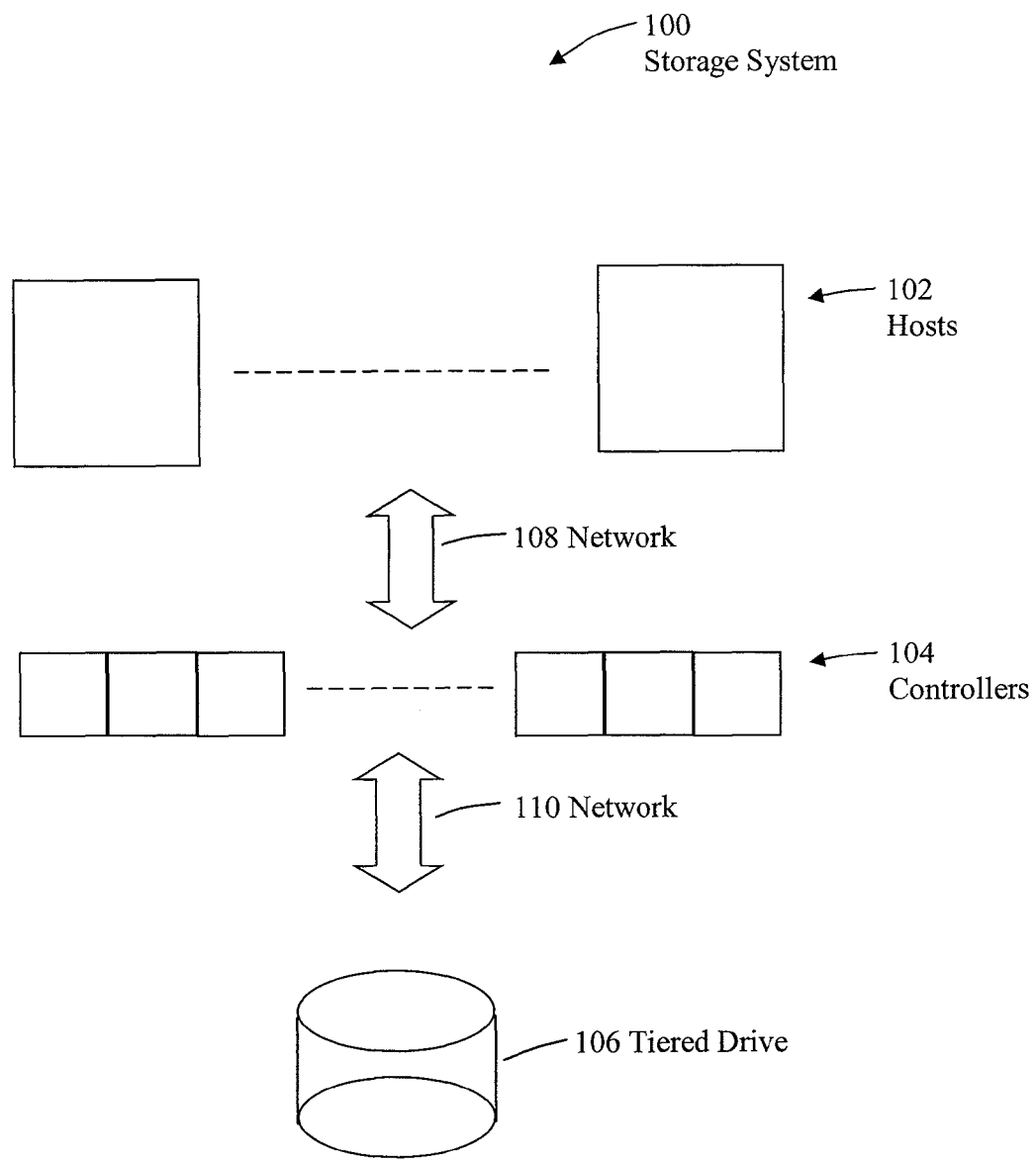
FIG. 1 is a schematic illustration of an embodiment of a storage system.

FIG. 1 is a schematic illustration of a storage system 100. As illustrated in FIG. 1, hosts 102 are interconnected with the controllers 104 via network 108. Data and commands are transferred between the hosts 102 and controllers 104 on network 108. Controllers 104 are interconnected to tiered drive 106 through network 110. Controllers 104 control the transfer of data between the hosts 102 and tiered drive 106. Tiered drive 106 may comprise a large storage pool of less expensive and slower devices, such as SATA drives, a smaller pool of more expensive and faster drives, such as SAS disk drives, and an even smaller pool of very fast, solid state storage devices, such as DRAM. The tiered drive 106 is configured to move the more frequently accessed data (hot data) to the faster storage devices, data that is not as frequently accessed to the pool of medium capability drives and the least frequently used data to the large pool of less expensive drives. This process of tiering gives greater performance per unit cost than other comparable configurations. A key to ensuring high performance of a tiered drive system, such as tiered drive 106, is to accurately determine how much the data is accessed, i.e., the temperature of the data. Due to constant changing access patterns of applications, the process of determining when data is hot or cold, or the relative temperature of the data, is the key to performance of the tiered drive 106.

Figure 2:
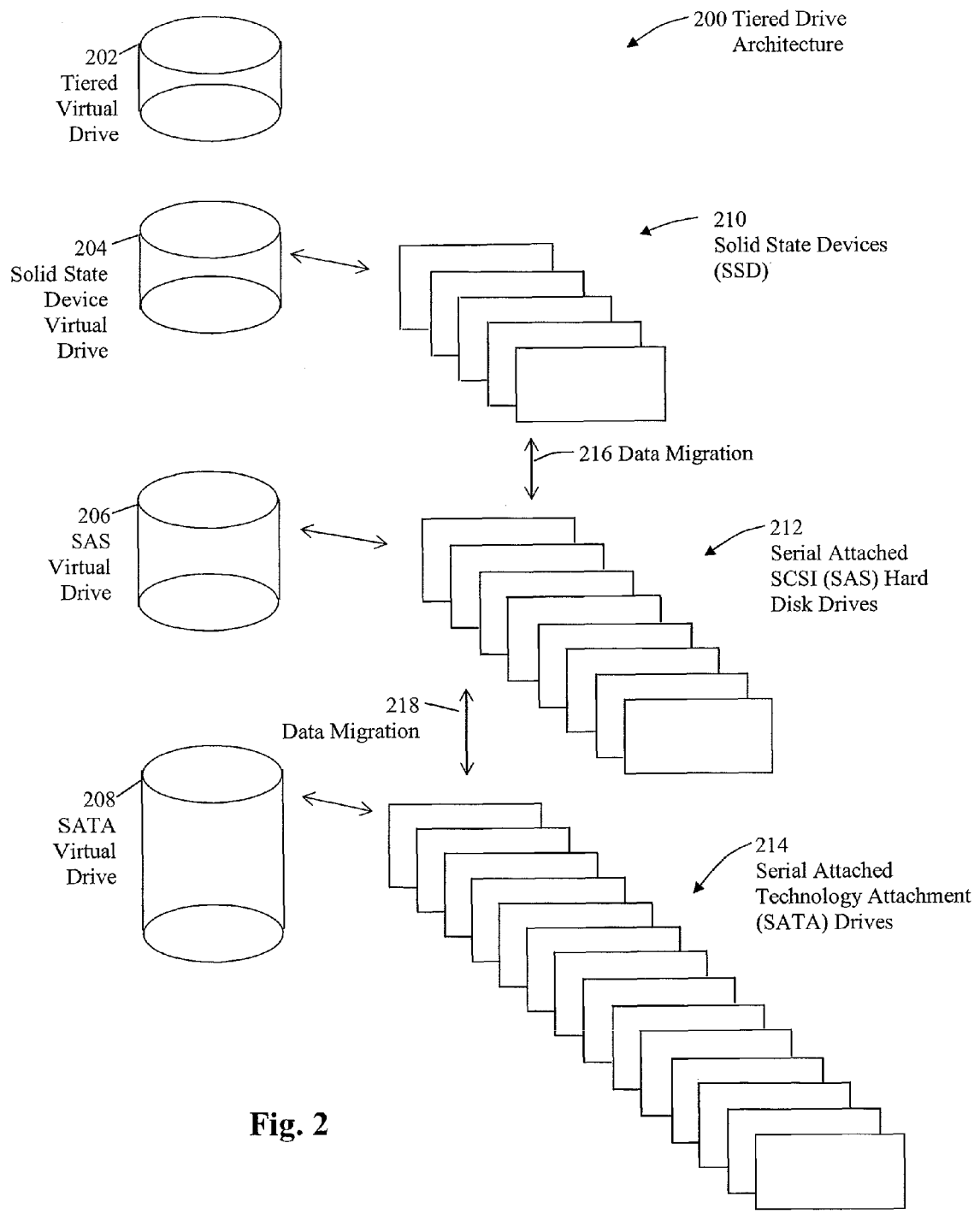
FIG. 2 is a schematic diagram of an embodiment of a tiered drive architecture.

FIG. 2 is a schematic illustration of a tiered drive architecture 200. The tiered drive architecture comprises a tiered virtual drive 202, a solid state device virtual drive 204, a serial attached SCSI (SAS) virtual drive 206 and a serial attached technology attachment virtual drive 208. The solid state device virtual drive 204 comprises a virtual architecture of the physical solid state devices 210. The physical solid state devices 210 are high speed solid state devices, such as DRAM, that are capable of reading and writing data at a very high rate of speed. SAS virtual drive 206 is a virtual drive associated with serial attached SCSI (SAS) hard disk drives 212. SAS virtual drive 206 provides logical addresses for organization of the data in SAS hard drive disk 212. SATA virtual drive 208 is the virtual drive that is associated with the serial attached technology attachment (SATA) drives 214. SATA virtual drive 208 provides the logical addresses for the data that is stored in the SATA drives 214.

In accordance with the tiered drive architecture 200 of FIG. 2, the hottest data, i.e., the data that is most accessed, is stored in solid state drives 210. The warm data is stored in SAS hard disk drives 212. The cold data is stored in SATA drives 214. Controllers, such as controllers 104 of FIG. 1, determine the location of the data based upon the relative temperature of the data. As such, the tiered drive architecture 200 functions more like a translation look aside buffer than a standard cache. The data is then moved dynamically, as the access patterns change, that is, as the temperature of the data changes. As shown FIG. 2, data can migrate between the solid state devices 210 and SAS hard disk drives 212, as shown by data migration 216. Data migration 216 is performed using controllers, such as controllers 104, to move the data between the solid state devices 210 and the SAS hard disk drives 212. Data migration 216 is performed using standard communication techniques over network 108. The data migration 216 is actual migration of data between drives and is not a change in logical indexing. Similarly, data migration 218 occurs between SAS hard disk drives 212 and SATA drives 214, as data becomes hotter or colder. Again, this is an actual migration of data between the drives, and not a change in logical indexing.

In order to properly move data between the storage tiers, illustrated in FIG. 2, data is organized in extents. Each extent is a collection of several blocks of data and is treated as a single segment. An extent, for example, in one embodiment, may have a one megabyte size. The data stored in the tiered drive architecture 200 is evaluated and migrated between tiers by extents. If an extent is determined to be hot data, the data is placed in the solid state drives 210. Embodiments of the present invention utilize a unique relative scoring mechanism to determine the temperature of the data.

In accordance with one embodiment of the invention, a base score is determined, based on the number of I/Os and the type of I/Os that are performed by the tiered drive architecture 200. For example, the tiered drive architecture 200 may have one million I/Os over a designated period of time. A base score is calculated in accordance with equation 1.

$$B = (E + A)/E \qquad \text{Equation 1}$$

where B is the base score, E is the extent size and A is calculated as follows:

$$A = 2 \times \text{the number of reads} + \text{the number of writes}. \qquad \text{Equation 2}$$

For example, if the total size of the hot tier, i.e., solid state devices 210, is one terabyte and each extent size is one megabyte, then E is equal to one terabyte/one megabyte=one million. If the entire tiered drive architecture 200 has 250,000 reads and 500,000 writes over a period of time, A is equal to 1,000,000. The base score B is equal to $$B = [1,000,000(E) + 1,000,000(A)]/1,000,000(E) = 2. \qquad \text{Equation 3}$$

In other words, the base score in this example is 2. If the overall score for A for the entire tiered drive architecture 200 is 10,000,000, then the base score equals $$B = [1,000,000(E) + 10,000,000(A)]/1,000,000(E) = 11. \qquad \text{Equation 4}$$

In this fashion, the base score measures the weighted I/O activity relative to the size of the hot tier. As the I/O activity increases, the base score also increases.

Extents also accumulate hit scores based upon the number of hits received by an extent. A hit score for an extent is calculated in the same manner as the access score A. In one embodiment, a hit score is calculated by providing a score of 2 for reads and 1 for writes. A heat index for each extent is calculated by multiplying the base score times the hit score. As such, the heat index is not an absolute number, but is a function of the base score.

Figure 3:
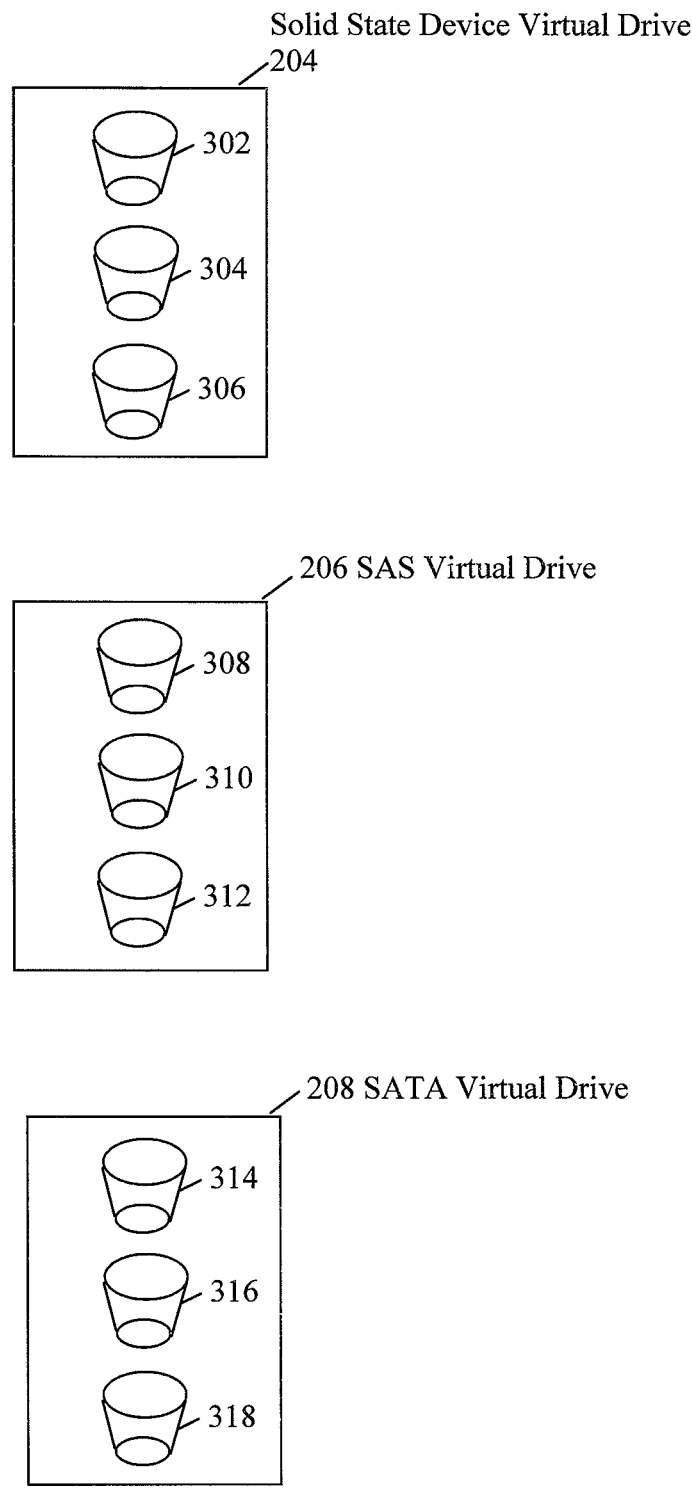
FIG. 3 is a schematic diagram of buckets for arranging extents by heat indices.

As disclosed in FIG. 3, the heat indices can be arranged in buckets, such as buckets 302-318. Solid state device virtual drive 204 includes buckets 302-306. SAS virtual drive 206 includes buckets 308-312. SATA virtual drive 208 includes buckets 314-318. Extents can be stored in one of the heat index buckets 302-318, based upon the heat index of the extent. For example, the coolest data bucket 318 may have a heat index of the base score times 2 that corresponds to the coolest data. Bucket 316 may have a heat index of the base score times 3. Bucket 314 may have a heat index of the base score times 4. Bucket 302 may have a heat index of the base score times 10. This process may progressively proceed up the series of buckets until the hottest extents reach bucket 302. Extents are moved between heat buckets and between the tiers 204, 206, 208, depending upon the score of the extent that is achieved by the extent during the previous monitoring period. As the extents move to buckets with a higher heat index score, the data set, i.e., the number of extents in each heat bucket, becomes smaller. Thus, less time is required in monitoring the status of extents that are likely to become hot enough to be moved to a faster tier.

At each monitoring period, all of the buckets are scanned to check if the extents should be moved to another bucket. The monitoring period can be a selected period that accounts for idle time on servers and also provides sufficient time to have enough I/O activity to ensure a robust evaluation. In accordance with one embodiment of the invention, monitoring is done after the number of I/Os equals 3×E (number of extents in the hot tier). Extents are drained from the highest heat index bucket once the number of extents stored in the bucket reaches an optimum size. The same number of buckets is maintained for the extents which are hot and are placed in the hot tier as a result of an I/O request, or as a result of being moved to a hot tier previously when the extent became hot. Extents trickle down to buckets with a lower heat index as they lose heat. These extents may then become candidates for replacement.

Figure 4:
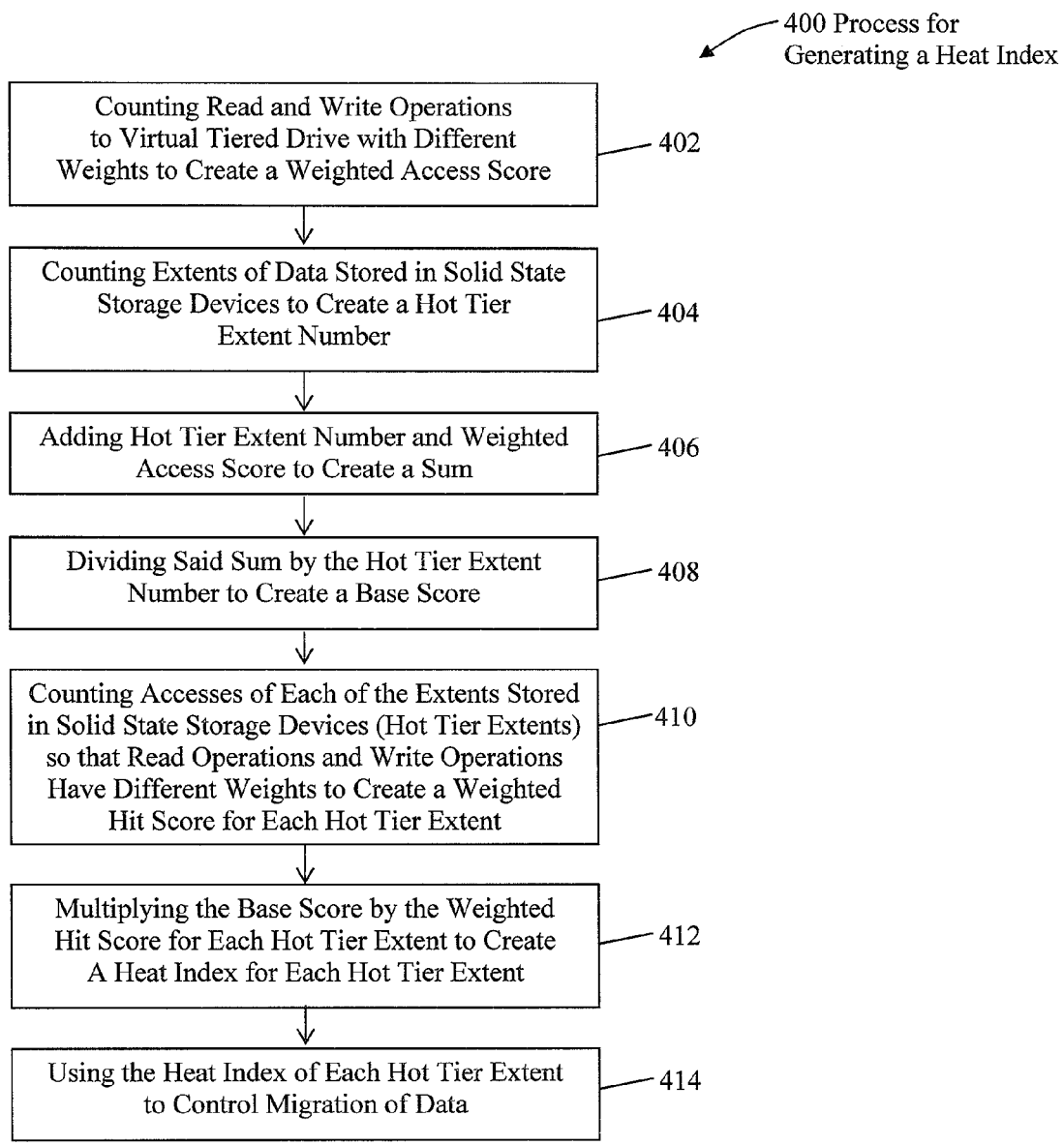
FIG. 4 is a flow diagram of a process for generating a heat index for an extent of data.

FIG. 4 is a flow diagram of a process 400 for generating a heat index. At step 402, read and write operations that occur on the virtual tier drive 202 are counted with different weights, to create a weighted access score. In one embodiment, read operations are given a count of 2, while write operations are given a count of 1. In step 404, the number of extents of data that are stored in the solid state storage devices are counted to create a hot tier extent number. At step 406, the hot tier extent number is added to the weighted access score to create a sum. At step 408, the sum is divided by the hot tier extent number to create a base score. At step 410, the number of accesses of each of the extents stored in the solid state devices, i.e., hot tier extents, is counted so that the read operations and write operations have different weights to create a weighted hit score for each hot tier extent. In one embodiment, read operations are given a score of 2, while write operations are given a score of 1. This is because the solid state storage devices are much better at performing read operations than write operations. At step 412, the base score is multiplied by the weighted hit score for each hot tier extent to create a heat index for each hot tier extent. At step 414, the heat index for each hot tier extent is used to control the migration of data. As described above, in one embodiment, hot tier extents are placed in different buckets according to the heat index of each hot tier extent. Extents may then be moved between tiers as the heat index of the extents changes.

Hence, the various embodiments disclose the concept of using a weighted score for computations with read operations receiving more weight than write operations. This is the result of the fact that solid state devices perform exceedingly well with read operations when compared to write operations. As such, read operations deserve more weight than write operations. For example, if there are two extents, with each receiving five accesses, and the first extent receives one write operation and four read operations and the second extent receives three write operations and two read operations, then the first extent achieves a higher score and become a better candidate to move into heat index buckets.

The heat index associated with each bucket is a function of a base score, rather than an absolute value. This relative scoring helps in determining heat associated with a data block relative to the rest of the tiered drive architecture 200. This is analogous to the fact that an extent with a score of 10 carries more heat with 1,000,000 I/Os than with 2,000,000 I/Os. This approach allows for dynamic determination of hot data, depending on the type and amount of I/Os that occur. Replacement candidates can also be determined using this technique.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of determining a heat index for an extent of data stored in a tiered drive comprising:
   determining a weighted access score by counting read operations from, and write operations to, said tiered drive, and weighting read operations with a higher score than write operations;
   determining a number of extents stored in a hot tier of said tiered drive, said hot tier having a predetermined size;
   calculating a base score that indicates weighted accesses relative to said predetermined size of said hot tier by adding said number of extents in said hot tier plus said weighted access score to generate a sum, said sum being divided by said number of extents;
   generating a weighted hit score by counting a number of accesses for each extent with reads having a greater weight than writes;
   generating a heat index score for each extent by multiplying said base score by said weighted hit score.

2. The method of claim 1 wherein said process of determining a weighted access score comprises:
   weighting said read operations with twice the weight of write operations.

3. The method of claim 1 wherein said process of generating a weighted hit score comprises:
   weighting said read operations with twice the weight of write operations.

4. The method of claim 1 further comprising:
   storing said extents in buckets based upon said heat index.

5. A system for storing data in a tiered drive based upon a heat index comprising:
   a tiered virtual drive comprising:
     a solid state virtual drive comprising a plurality of solid state storage devices;
     a SAS virtual drive comprising a plurality of SAS storage devices;
     a SATA virtual drive comprising a plurality of SATA storage devices;
   a plurality of controllers that control migration of data between said solid state storage devices, said SAS storage devices and said SATA storage devices by counting read and write operations of said tiered virtual drive to create a weighted access score, counting extents of data stored in said solid state storage devices to create a hot tier extent number, adding said hot tier extent number and said weighted access score to create a sum, dividing said sum by said hot tier extent number to create a base score, counting accesses in each of said extents stored in said solid state storage devices to create a weighted hit score for each of said extents, multiplying said base score by said hit score for each of said extents stored in said solid state storage devices to create a heat index for each of said extents stored in said solid state storage devices, using said heat index for each of said extents stored in said solid state storage devices to control said migration of data.

6. The system of claim 5 wherein said plurality of controllers controls migration of data by counting said read and write operations of said virtual drive with different weights.

7. The system of claim 5 wherein said plurality of controllers controls migration of data by counting said accesses of each of said extents stored in said solid state devices so that reads and writes have different weights.

* * * * *